(12) United States Patent
Liu et al.

(10) Patent No.: US 8,077,435 B1
(45) Date of Patent: Dec. 13, 2011

(54) CURRENT PERPENDICULAR-TO-PLANE READ SENSOR WITH BACK SHIELD

(75) Inventors: Feng Liu, San Ramon, CA (US);
Shaoping Li, San Ramon, CA (US);
Laurence L. Chen, Fremont, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 505 days.

(21) Appl. No.: 12/275,125

(22) Filed: Nov. 20, 2008

(51) Int. Cl.
*G11B 5/33* (2006.01)

(52) U.S. Cl. ............. 360/319; 360/123.12; 360/327.22
(58) Field of Classification Search .............. 360/319, 360/114.05, 123.12, 327.22
See application file for complete search history.

(56) References Cited

U.S. PATENT DOCUMENTS

| | | | |
|---|---|---|---|
| 6,381,107 B1 * | 4/2002 | Redon et al. ............... | 360/324.2 |
| 6,456,465 B1 | 9/2002 | Louis et al. | |
| 6,466,419 B1 | 10/2002 | Mao | |
| 6,512,660 B1 | 1/2003 | Li et al. | |
| 6,512,661 B1 | 1/2003 | Louis | |
| 6,680,827 B2 | 1/2004 | Li et al. | |
| 6,728,079 B2 | 4/2004 | Shimazawa | |
| 6,735,059 B2 | 5/2004 | Sato | |
| 6,757,144 B2 | 6/2004 | Carey et al. | |
| 6,943,993 B2 | 9/2005 | Chang et al. | |
| 6,980,403 B2 | 12/2005 | Hasegawa | |
| 7,333,304 B2 | 2/2008 | Gill et al. | |
| 2007/0217080 A1 | 9/2007 | Jayasekara et al. | |
| 2009/0262465 A1 * | 10/2009 | Hatatani et al. ............... | 360/319 |

\* cited by examiner

*Primary Examiner* — Tan T. Nguyen

(57) ABSTRACT

Disclosed is a read head for reading data from a magnetic media. The read head includes a bottom magnetic shield layer, a top magnetic shield layer, and a read sensor disposed between the bottom and top magnetic shield layers. The read sensor is configured for sensing changes in a magnetic field of the magnetic media positioned under the read sensor. The read sensor has a front end adjacent to an air bearing surface (ABS) and a back end opposite the front end. The read head also includes a back magnetic shield layer positioned between the bottom and top magnetic shield layers and behind the back end of the read sensor distal to the ABS.

18 Claims, 16 Drawing Sheets

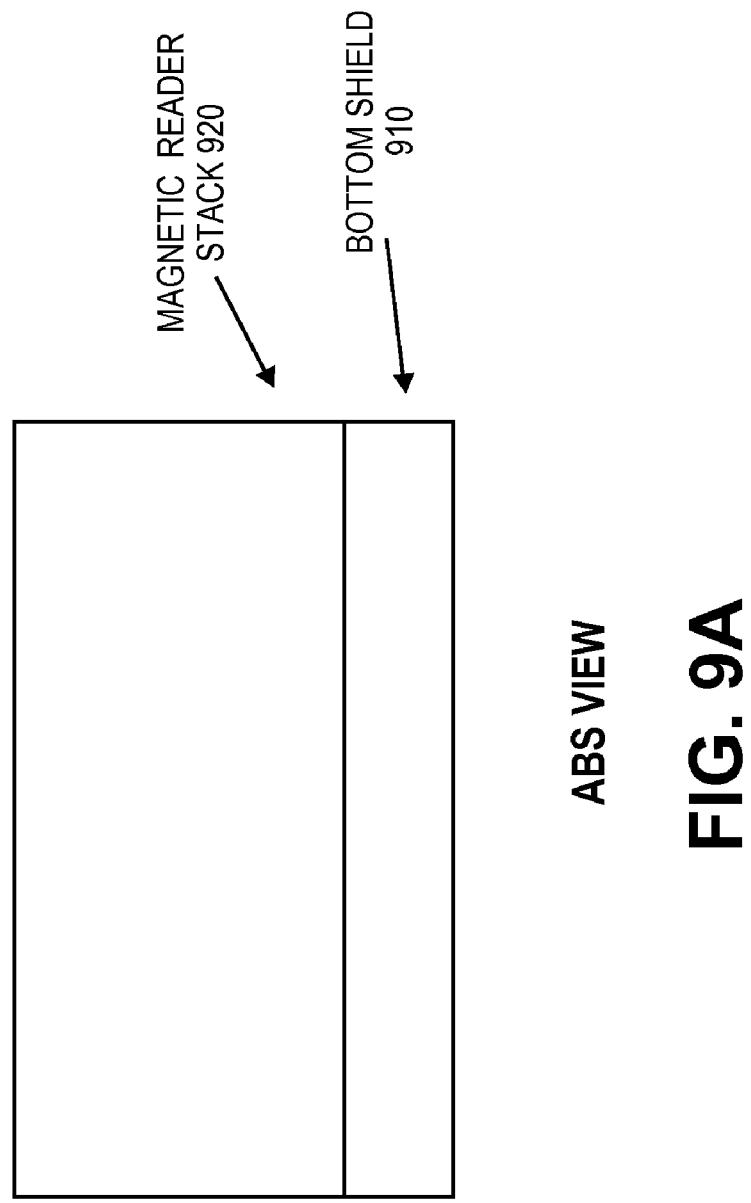

CROSS-SECTIONAL VIEW

CROSS-SECTIONAL VIEW

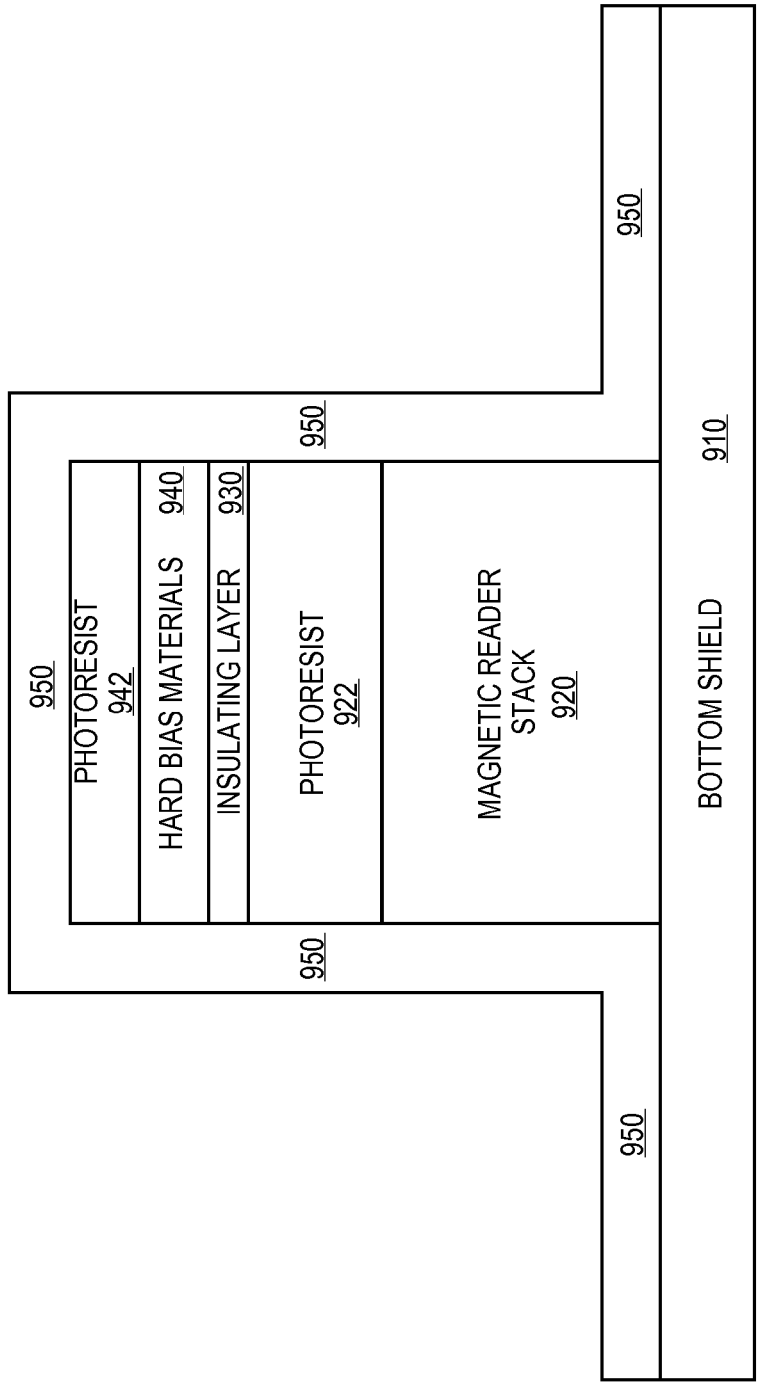

CROSS-SECTIONAL VIEW

ABS VIEW

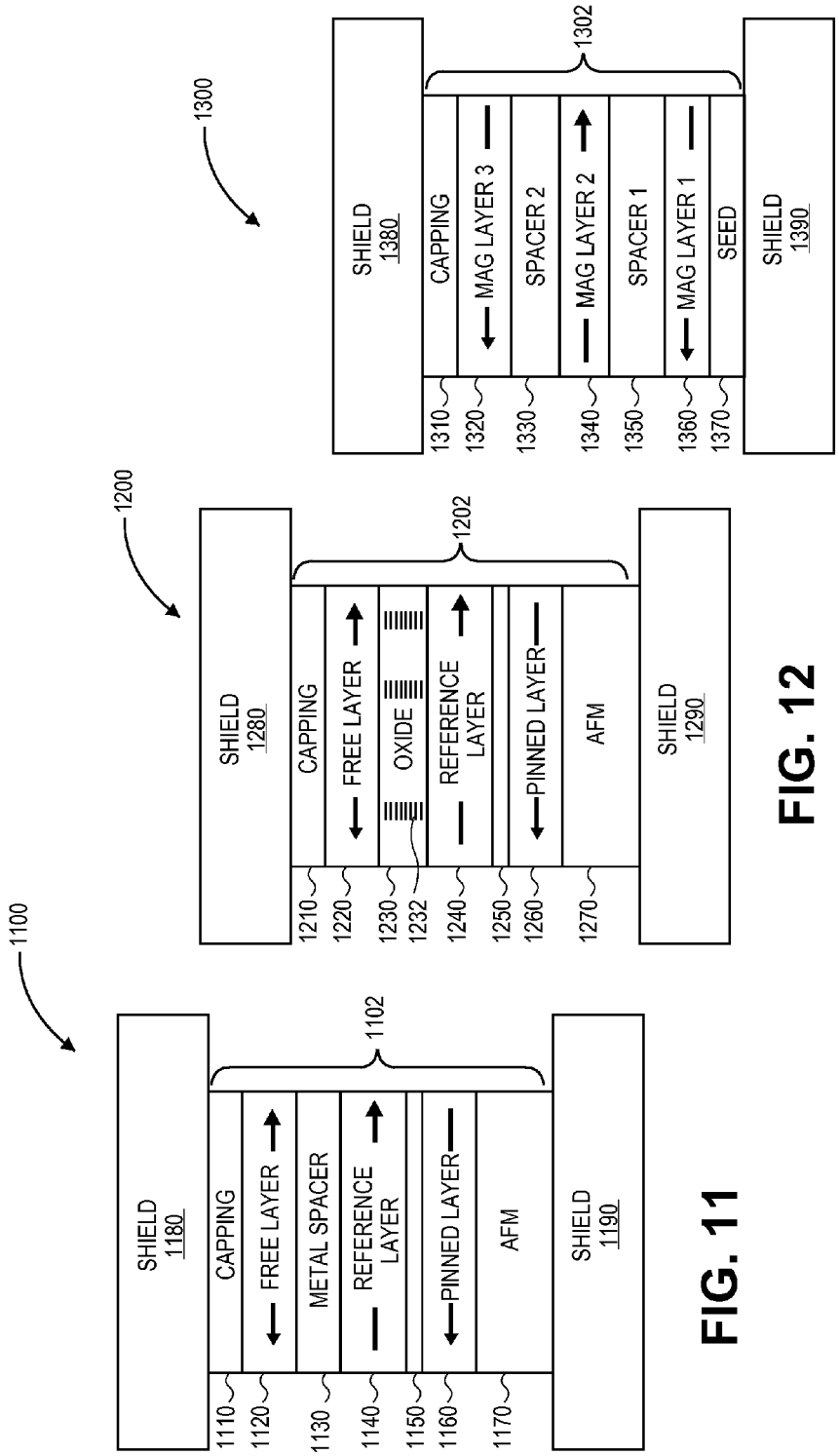

CURRENT PERPENDICULAR-TO-PLANE READ SENSOR WITH BACK SHIELD

FIELD OF THE INVENTION

The present invention relates generally to the field of magnetic read/write heads and magnetic data storage, and more particularly, to a current perpendicular-to-plane read head with back shield.

BACKGROUND

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information. Data density is determined by the amount of data stored on an area of magnetic media and depends on how much area must be allocated to each bit. Data on magnetic media is often stored in a line or track. Magnetic media often have multiple tracks. In the case of disks, the tracks are nested annular rings with more bits per track and more tracks per disk with increasing data density. Data density or areal density, therefore, is determined by both the bit length and by the width of the bit. To decrease bit size, head size is decreased by fabricating thin film read and write heads.

Ongoing, important goals of researchers in magnetic recording technology include producing disk drive read heads that achieve strong signals, providing accurate readback of those signals, minimizing noise interference, and providing very high areal density while controlling manufacturing costs. Unfortunately, some of these goals directly conflict with one another. For example, to achieve ever-higher areal densities, track widths on a disk become smaller necessitating that the components used to read and write data also become smaller, which makes manufacturing more difficult and expensive.

High density recording, such as over 100 Gbit/in2, requires a highly sensitive read head. At higher densities, resistance changes in the head originating from the giant magnetoresistive (GMR) effect are reduced based on the progressively smaller dimensions of the length of the read head. The GMR effect (as well as the MR effect) is the measure of changes in electrical resistance of magnetically soft material, with the GMR effect found specifically in thin film materials systems. In current-in-plane (CIP) read heads, electrical current flows between contacts parallel to the disk or media surface through a GMR element or a read sensor with changes in resistance detected by voltage changes (i.e., readback voltage or output signal). More sensitive read heads, current-perpendicular-to-plane (CPP), have current flows through the films or GMR elements perpendicular to the long axis of the structure and parallel to the disk or media surface. The sensitivity of the CPP read heads has recently been further enhanced by building CPP read head structures that utilize tunneling magnetoresistance (TMR) concepts in which electrons "tunnel" through very thin insulators based on the magnetization of layers above and below the insulator.

In conventional current perpendicular-to-plane magnetic recording head design, the read sensor is shielded by both a bottom and a top shield as shown in FIG. 1A from an air bearing surface (ABS) view and a cross-sectional view in FIG. 1B. The top shield and the bottom shield are spaced apart on opposite sides of the reader stack in a longitudinal direction.

The read sensor reads back magnetic signals from written transitions. With increasing areal density, the ever shrinking written transitions require reader sensors with high read back amplitude. In conventional read sensor design, the sensed media field 200 decays exponentially along sensor stripe height direction, as shown in FIG. 2. The back end of the read sensor is not responsive magnetically.

BRIEF DESCRIPTION OF THE DRAWINGS

FIGS. 9A-9K illustrate a sequence of process operations for manufacturing a CPP read head, in accordance with one embodiment of the invention;

FIG. 11 is an ABS view of a CPP read head with back shielding for a GMR implementation with a metal spacer layer, according to one embodiment of the invention;

FIG. 12 is an ABS view of a CPP read head with back shielding for a GMR implementation with a current confinement path, according to one embodiment of the invention; and FIG. 13 is an ABS view of a CPP read head with back shielding for a GMR implementation with multiple spacer layers, according to one embodiment of the invention.

DETAILED DESCRIPTION

Figure 1A:
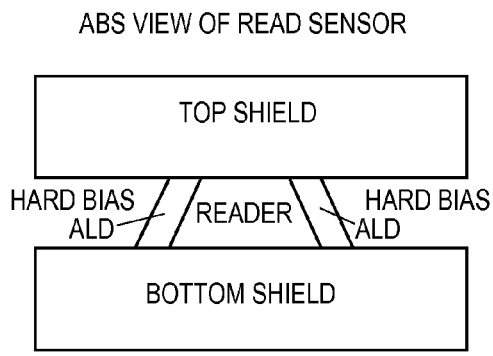
FIG. 1A shows an ABS view of a conventional current-perpendicular-to-plane (CPP) read head design.
Figure 1B:
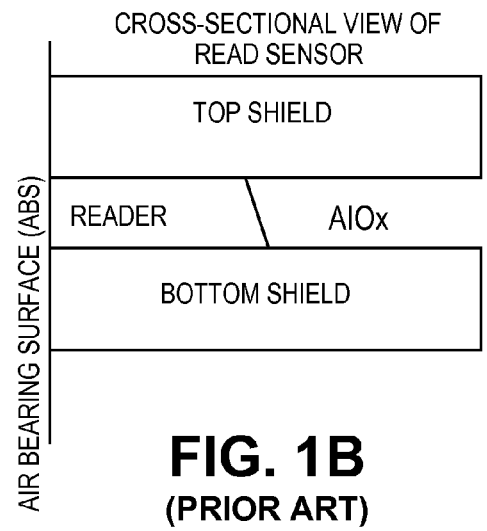
FIG. 1B shows a cross-sectional view of the conventional CPP read head design.
Figure 2:
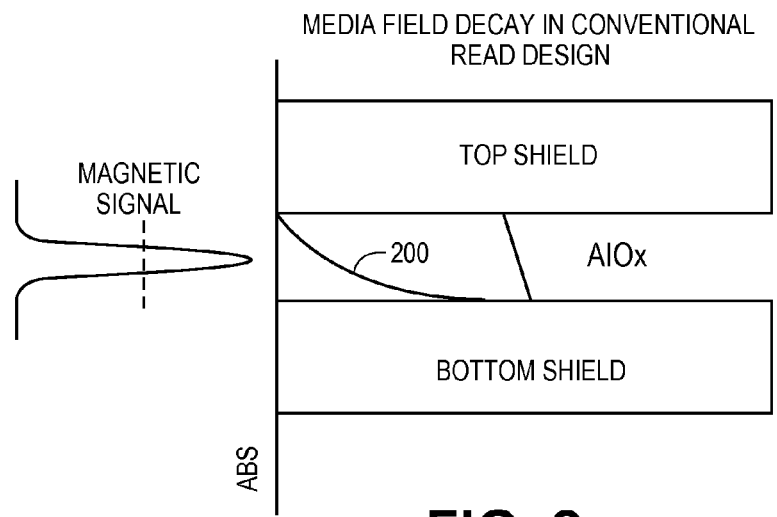
FIG. 2 shows a magnetic field decay in the conventional CPP read head design.
Figure 3:
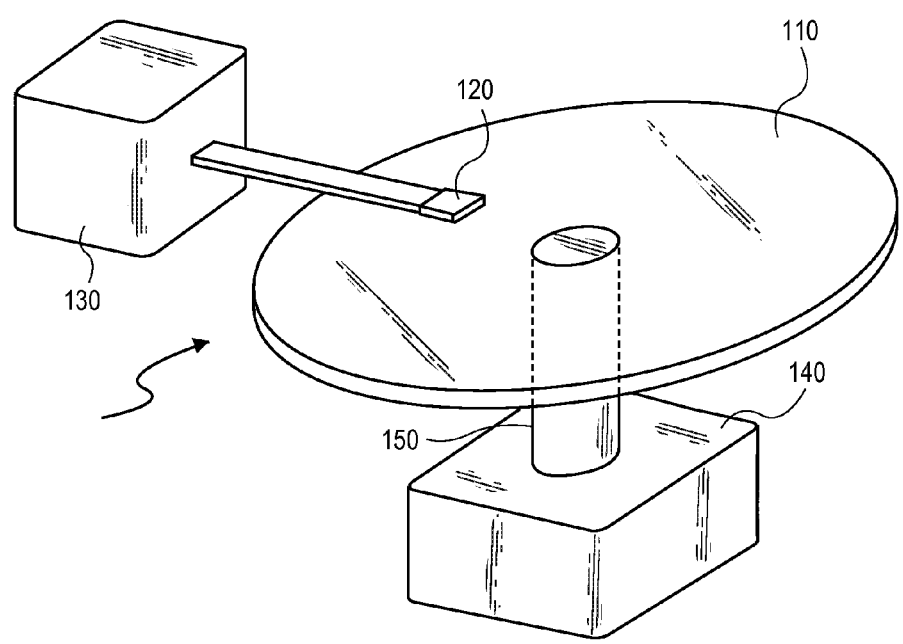
FIG. 3 shows a simplified block diagram of an exemplary disk drive, according to one embodiment.

FIG. 3 shows a typical disk type magnetic data storage and retrieval system 100 in which embodiments of the CPP read head of the invention may be incorporated. The read head with the back shield of the present invention is located within a merged read/write head assembly 120 that rides above a magnetic storage media 110, depicted in FIG. 3 as a rotatable hard disk type storage media. The hard disk 110 is coupled to a drive device 140 (e.g., motor) via a spindle 150 to provide rotation of the disk 110 relative to the head assembly 120. An actuating device 130 may be used to position the head assembly 120 above the surface of the media 110 to read and write data in the form of magnetic bits from and to the media 110. Of course, the data storage and retrieval system 100 typically has several hard disks 110 and several corresponding head assemblies 120, not shown here for ease of description. The writer portion of the read/write head assembly 120 is not limited to the invention and its configuration may vary significantly to practice the invention as long as the writer portion is combined with a back shielded read head or reader portion as described below. Further, in some cases, a read head may be provided without a writer and the system 100 would simply substitute such a read head constructed according to the invention for the read/write head assembly 120.

Figure 4A:
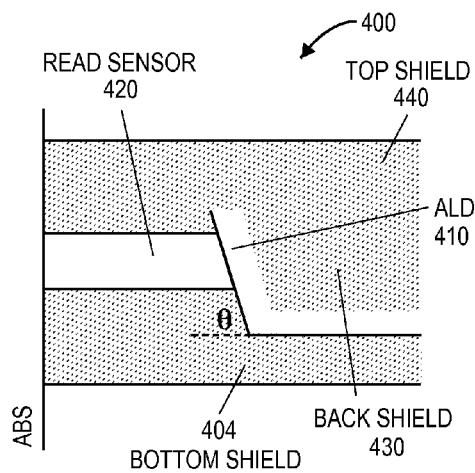
FIG. 4A is a cross-sectional view of a CPP read head with back shielding, according to one embodiment of the invention.

FIG. 4A is a cross-sectional view of a CPP read head 400 with back shielding, according to another embodiment of the invention. The head 400 is shown in cross-section as seen from the air bearing surface (ABS) between the head 400 and a recording medium. As shown, the read head 400 includes a bottom magnetic shield layer 404 formed of a soft magnetic alloy, such as a NiFe alloy, a CoZrNb alloy, CoNiFe alloy, and the like, which is generally formed on a ceramic substrate (not shown), such as alumina. An insulating layer 410 is deposited partially over the bottom magnetic shield layer 404 and partially along a back end of a read sensor 420, which is opposite a front end adjacent to the ABS. The insulating layer 410 is typically formed of alumina (e.g., $Al_2O_3$), aluminum nitride, or materials with similar insulating properties. For example, the insulating layer 410 may be formed with alumina layer deposition (ALD). The read sensor 420 or reader stack is built on the bottom shield 404. The read sensor 420 is configured to sense changes in a magnetic field of the magnetic media 110 positioned under the read sensor 420.

A back magnetic shield layer 430 formed of soft magnetic material is deposited over the insulating layer 410 and behind the back of the read sensor 420, which includes a magnetically free layer. A top magnetic shield layer 440 formed of soft magnetic material is deposited over the read sensor 420 and the back magnetic shield layer 430. The top magnetic shield layer 440 is coupled, directly or indirectly, to the back magnetic shield layer 430. The back and top shield layers are typically formed of the same material chosen for the bottom shield layer 404, i.e., alumina, alumina nitride, and the like. The insulating layer 410 is positioned between the back shield layer 430 and the bottom shield layer 404 as well as the back shield layer 430 and the read sensor 420 in order to electrically isolate the back shield layer 430 and the read current path. The angle θ is the slope of the back end of the read sensor 420. This angle θ can be less than 90 degrees as illustrated in FIGS. 4A and 4B or it could be approximately 90 degrees as illustrated in FIGS. 5A and 5B.

Figure 4B:
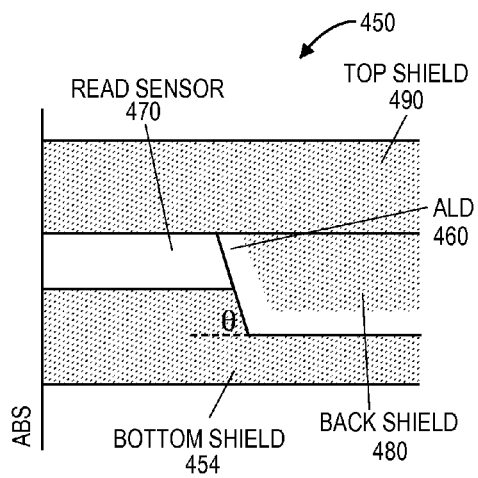
FIG. 4B is a cross-sectional view of a CPP read head with back shielding, according to another embodiment of the invention.

FIG. 4B is a cross-sectional view of a CPP read head with back shielding, according to another embodiment of the invention. The read head 450 includes a bottom magnetic shield layer 454, an insulating layer 460, a read sensor 470, a back magnetic shield layer 480, and a top magnetic shield layer 490. These layers are similar to the layers described in the read head 400 and arranged in a similar manner in comparison to the layers described in the read head 400. However, the insulating layer 460 does not extend beyond the top of the read sensor 470 as illustrated in FIG. 4B.

Figure 5A:
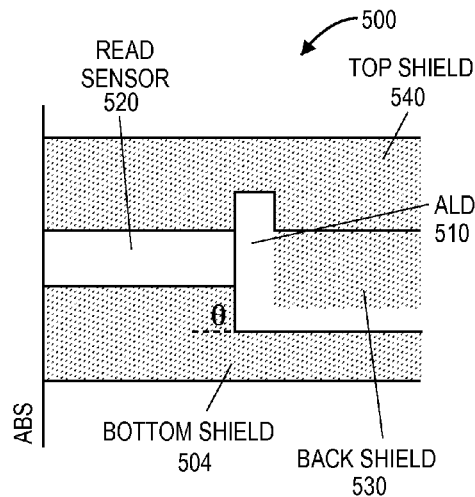
FIG. 5A is a cross-sectional view of a CPP read head with back shielding, according to another embodiment of the invention.

FIG. 5A is a cross-sectional view of a CPP read head with back shielding, according to another embodiment of the invention. The read head 500 includes a bottom magnetic shield layer 504, an insulating layer 510, a read sensor 520, a back magnetic shield layer 530, and a top magnetic shield layer 540. These layers are similar to the layers described in the read head 400 and arranged in a similar manner in comparison to the layers described in the read head 400. However, the back end of the read sensor 520 is vertical forming a 90 degree angle with an imaginary horizontal line parallel to the bottom shield and the substrate as illustrated in FIG. 5A.

Figure 5B:
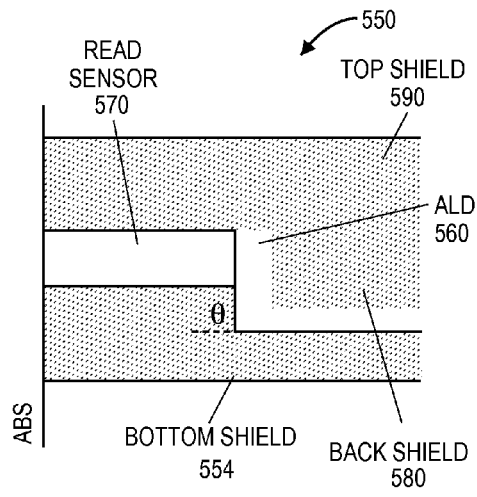
FIG. 5B is a cross-sectional view of a CPP read head with back shielding, according to another embodiment of the invention.

FIG. 5B is a cross-sectional view of a CPP read head with back shielding, according to another embodiment of the invention. The read head 550 includes a bottom magnetic shield layer 554, an insulating layer 560, a read sensor 570, a back magnetic shield layer 580, and a top magnetic shield layer 590. These layers are similar to the layers described in the read head 400 and arranged in a similar manner in comparison to the layers described in the read head 500. However, the insulating layer 560 does not extend beyond the top of the read sensor 570 as illustrated in FIG. 5B. These back shielded reader design variations allow for process flexibility. These back shielded reader designs have similar performance. The reader designs illustrated in FIGS. 5A and 5B have nearly ideal performance because with the 90 degree angle, the back shield is as close to the magnetic media as possible and can thus sense a stronger magnetic field.

The presence of the back shield layers discussed and illustrated above are uniquely positioned behind the back end of the read sensor, which includes a magnetically free layer, to increase a magnitude of the magnetic field sensed from the magnetic media 110. The magnetically free layer and other layers of the read sensor are discussed below in conjunction with FIGS. 10-13. The back magnetic shield layer is also positioned behind the back end of the read sensor and magnetically free layer to improve uniformity of a magnetic field sensed from the magnetic media 110. The back magnetic shield layer wraps around the back end of the read sensor. The conventional read head has an insulating layer, which does not conduct heat, wrapping around the back end of the read head. The back magnetic shield may be a soft magnetic alloy that acts as a heat sink resulting in a more thermally stable read head compared to the conventional read head.

Figure 6:
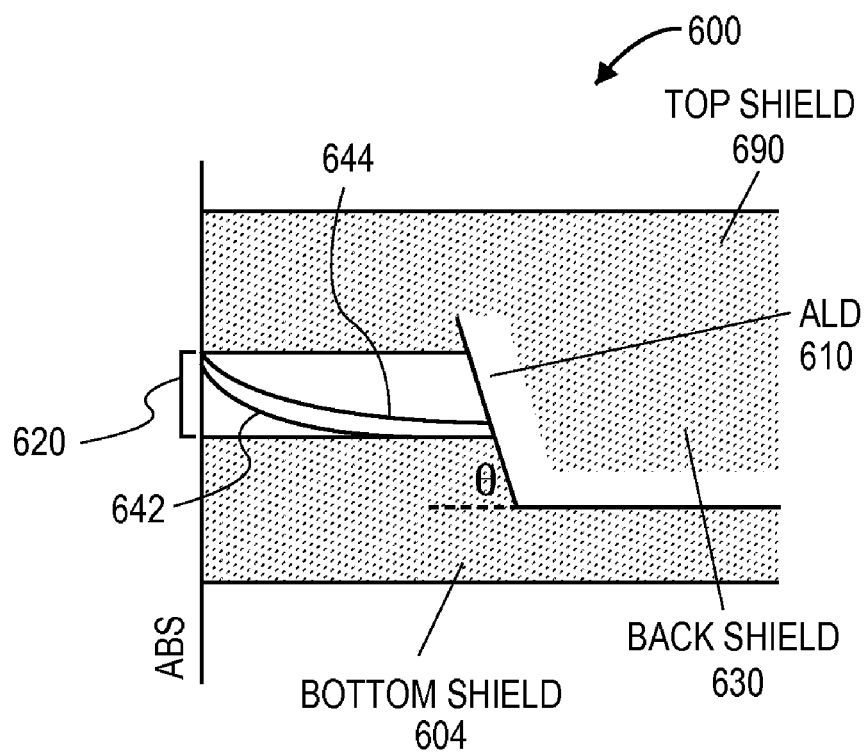
FIG. 6 shows a comparison of magnetic field decay in the conventional CPP read head and the CPP read head with back shielding, in accordance with one embodiment.

FIG. 6 shows a comparison of magnetic field decay in the conventional CPP read head and the CPP read head 600 with back shielding, in accordance with one embodiment. The presence of the back shield in the read sensor 620 changes the media field decay profile along the reader stripe height direction as illustrated in FIG. 6. The media field decay curve 642 is associated with a conventional reader design. The addition of the back shield 630 to the read head results in the media field decay curve 644, which has less decay in comparison to the curve 642. The back end of the read sensor 620 is magnetically responsive to the media field for the back shielded design, which results in a significantly improved read back amplitude as well as reader signal to noise ratio. The back magnetic shield layer 630 adds a bulk of high permeable material behind the back end of the read sensor 620 and magnetically free layer in order to pull more flux from the magnetic media 110. This increases the read sensor utilization factor or flux penetration length. The back shield is conformal to the back end of the read sensor.

Figure 7:
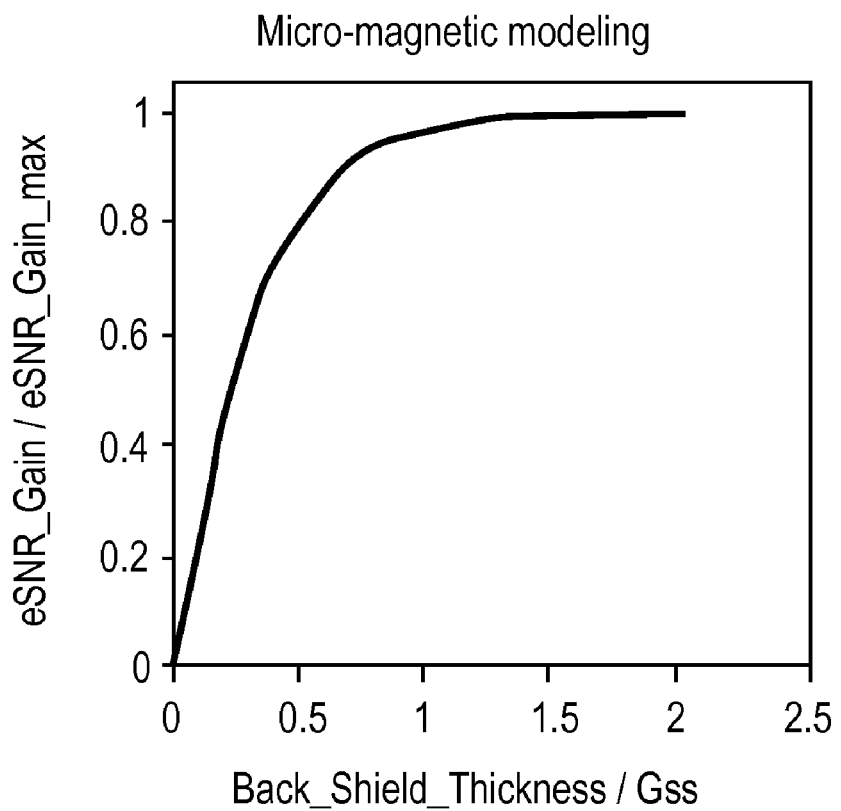
FIG. 7 is a graph illustrating micromagnetic modeling of electrical signal to noise ratio (eSNR) gain versus a ratio of back shield thickness to a distance between top and bottom shields, according to one embodiment of the invention.

FIG. 7 is a graph illustrating micromagnetic modeling of an electrical signal to noise ratio (eSNR) gain versus a ratio of back shield thickness to a spacing between top and bottom shields, according to one embodiment of the invention. The eSNR gain represents a reader on-disk read back signal to off-disk noise ratio, which includes magnetic noise in the read sensor without media noise. The eSNR gain is normalized by dividing by an eSNR gain maximum as illustrated in FIG. 7.

The eSNR gain maximum depends on the geometry of the read head including stripe height of the read sensor and top shield to bottom shield spacing. As the ratio of the thickness of the back shield layer to the spacing between top and bottom shields increases, the eSNR gain increases significantly. In one embodiment, the ratio of the thickness of the back magnetic shield layer to the spacing between the bottom and top magnetic shield layers is greater than 0.25 with the spacing being based on a stripe height of the read sensor. FIGS. 4A, 4B, 5A, and 5B illustrate different reader design variations having the ratio of the thickness of the back magnetic shield layer to the spacing between the bottom and top magnetic shield layers being between approximately 1 and 2.

Figure 8:
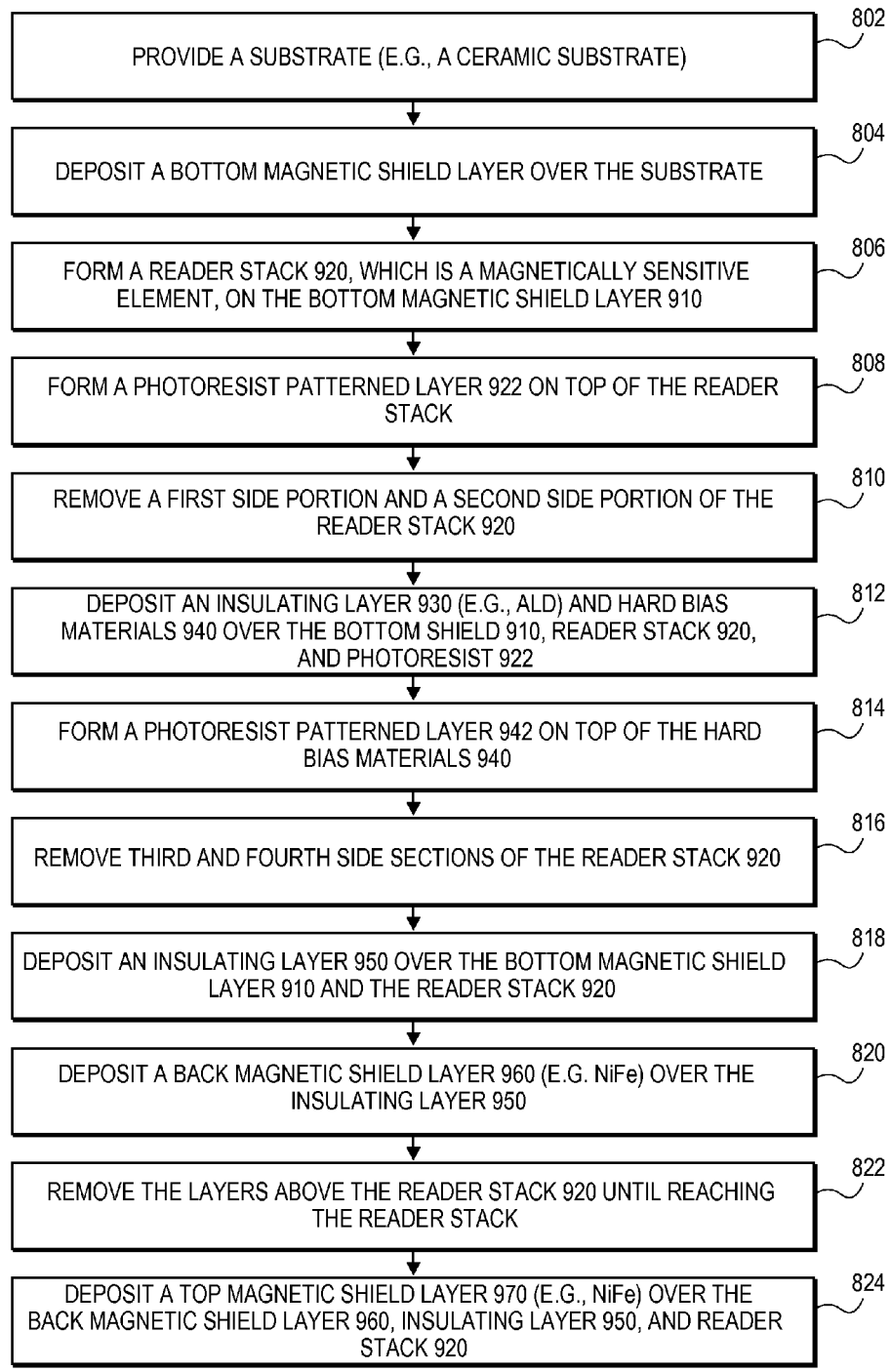
FIG. 8 is a flow diagram illustrating a method of manufacturing a CPP read head with back shielding, according to one embodiment of the invention.
Figure 9C:
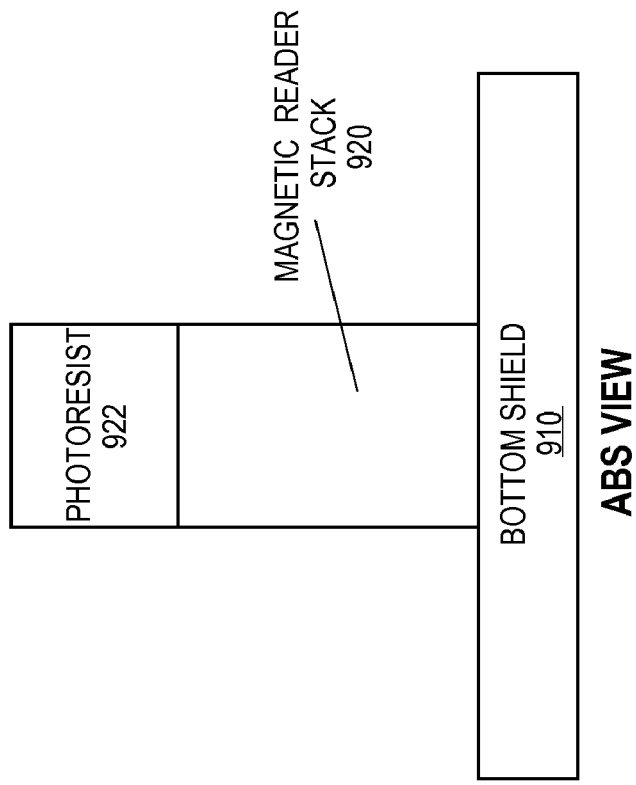
Figure 9B:
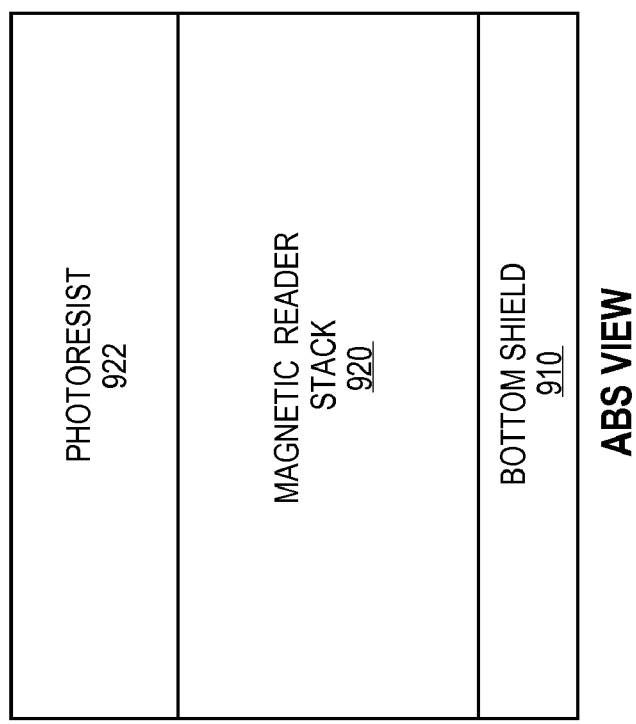

FIG. 8 is a flow diagram illustrating a process 800 of manufacturing a CPP read head with back shielding, according to one embodiment of the invention. At block 802, the process 800 provides a substrate (e.g., a ceramic substrate). At block 804, the process 800 deposits a bottom magnetic shield layer over the substrate. At block 806, the process 800 forms a reader stack or read sensor 920, which is a magnetically sensitive element, on the bottom magnetic shield layer 910 as illustrated in FIG. 9A from an ABS view. At block 808, the process 800 forms a photoresist patterned layer 922 on top of the reader stack 920 as illustrated in FIG. 9B from the ABS view. At block 810, the process 800 removes a first side portion and a second side portion of the reader stack 920 as illustrated in FIG. 9C from the ABS view. In one embodiment, an ion mill etch removes the first and second side portions of the reader stack 920.

Figure 9D:
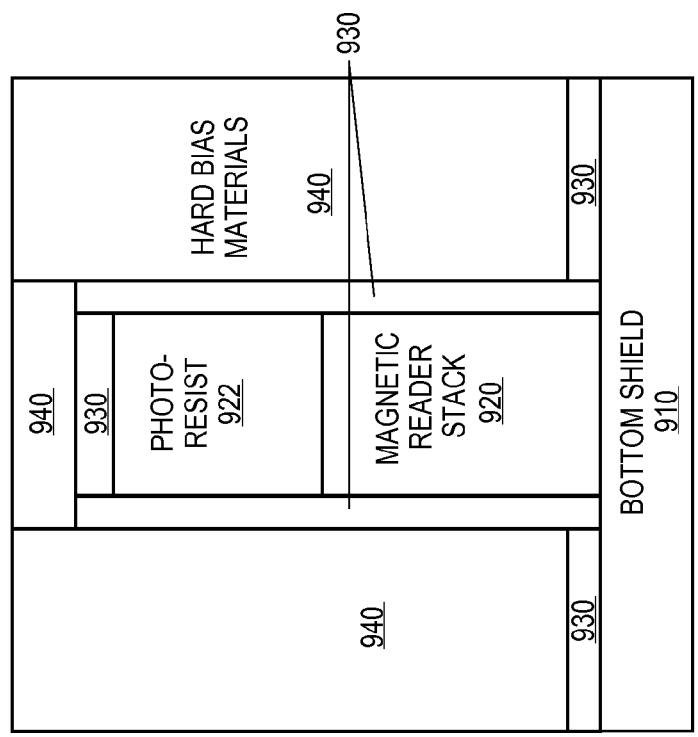
Figure 9F:
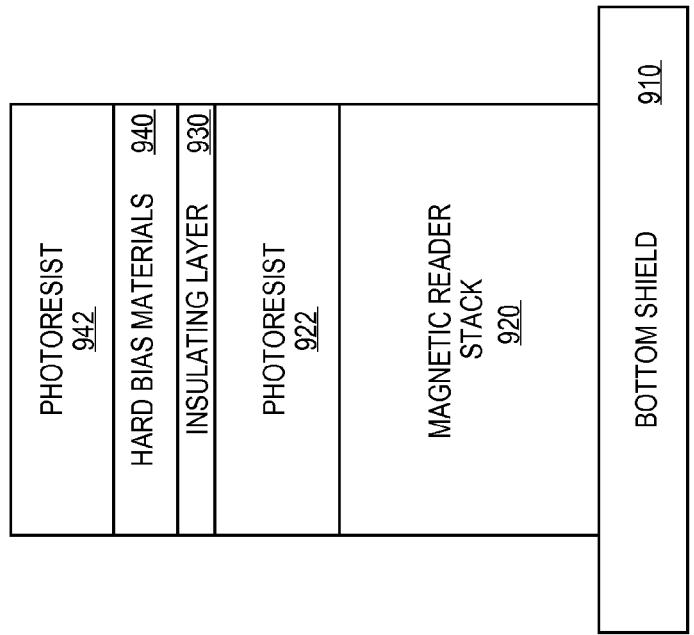
Figure 9E:
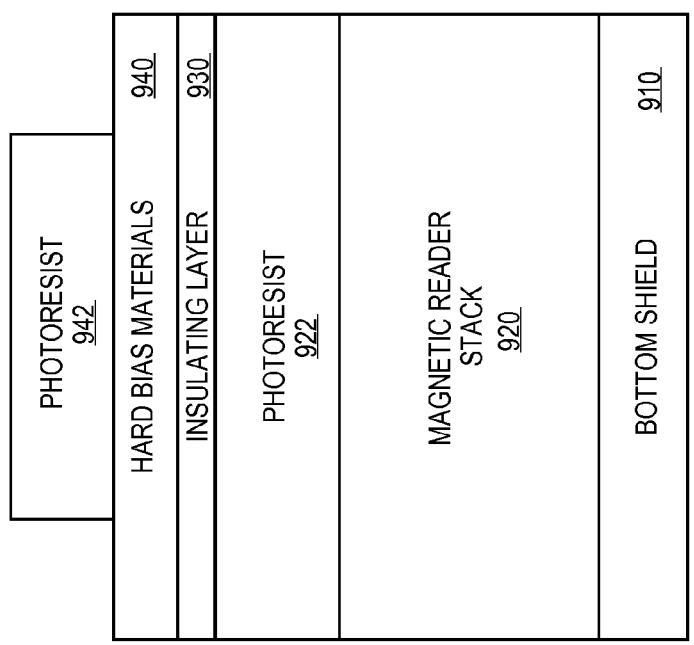

At block 812, the process 800 deposits an insulating layer 930 (e.g., ALD) and hard bias materials 940 (e.g., CoPt films, CoCrPt films, CoCrBPt films, and FePt films, etc.) over the bottom shield 910, reader stack 920, and photoresist 922 as illustrated in FIG. 9D from the ABS view. At block 814, the process 800 forms a photoresist patterned layer 942 on top of the hard bias materials 940 as illustrated in FIG. 9E from a cross-sectional view. At block 816, the process 800 removes third and fourth side portions of the reader stack 920 as illustrated in FIG. 9F from the cross-sectional view.

In one embodiment, an ion mill etch removes the third and fourth side portions of the reader stack. The ion mill etch determines the slope of the back end of the reader stack as illustrated in FIGS. 4A, 4B, 5A, and 5B. The slope may vary from 45 degrees to approximately 90 degrees.

Figure 9H:
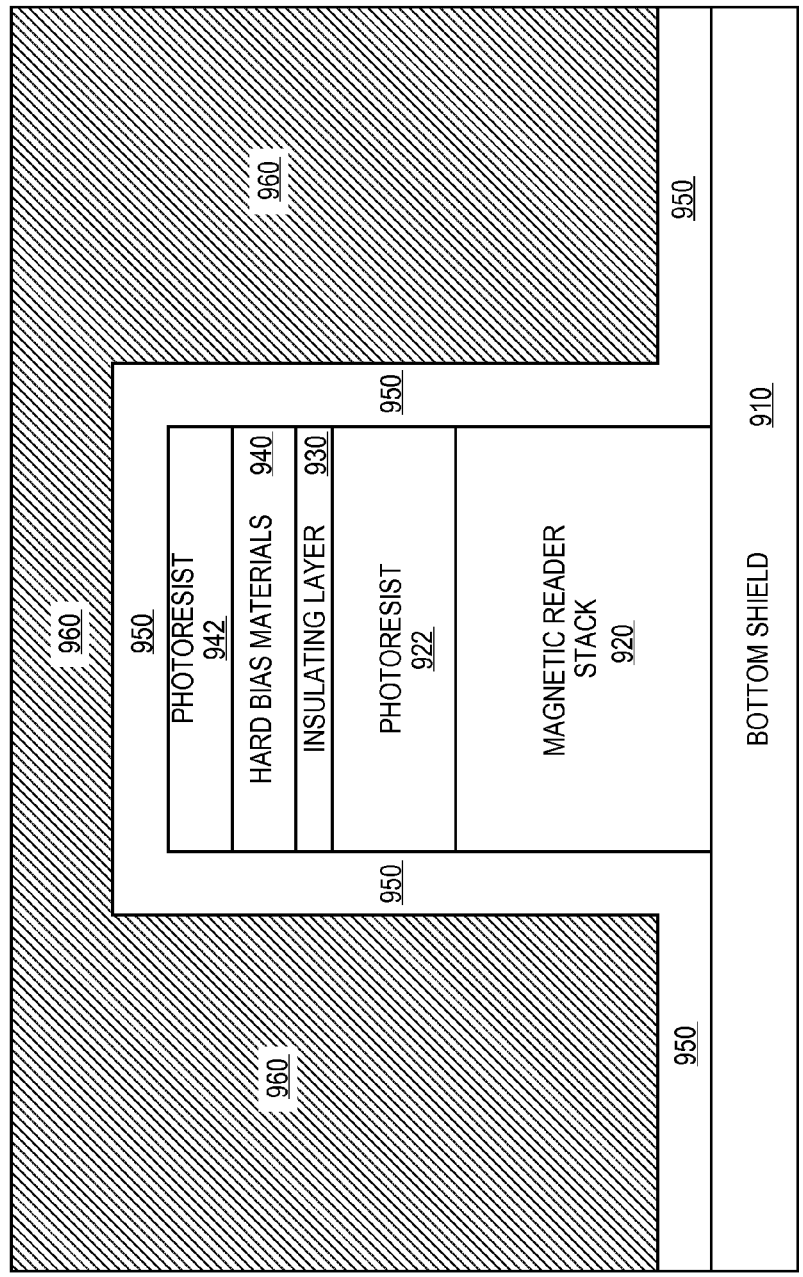
Figure 9I:
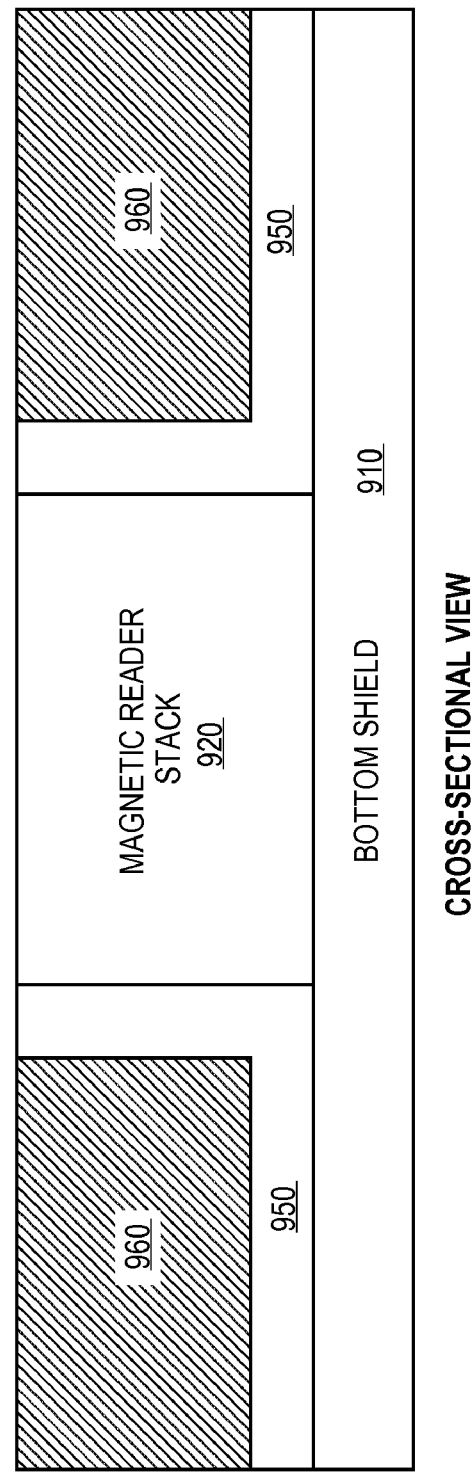

At block 818, the process 800 conformally deposits an insulating layer 950 over the bottom magnetic shield layer 910 and the reader stack 920 as illustrated in FIG. 9G from the cross-sectional view. The photoresist layers, the insulating layer 930, and the hard bias materials 940 are disposed between the reader stack 920 and the insulating layer 950. At block 820, the process 800 deposits a back magnetic shield layer 960 (e.g., NiFe) over the insulating layer 950 as illustrated in FIG. 9H from the cross-sectional view. At block 822, the process 800 removes the layers above the reader stack 920 until reaching the reader stack as illustrated in FIG. 9I from the cross-sectional view. In one embodiment, the layers are removed with a chemical mechanical polishing (CMP) operation as illustrated in FIG. 9I. The FIGS. 4B and 5B also illustrate read heads that have been fabricated with the CMP operation that planarizes all layers resulting in the top of the insulating layers being level with the top of the reader stack. In another embodiment, the layers above the reader stack 920 are removed with plasma etching operation(s) that also planarize the read head, but leave the top of the insulating layers above the top of the reader stack as illustrated in FIGS. 4A and 5A prior to the deposition of the top shield layer.

Figure 9J:
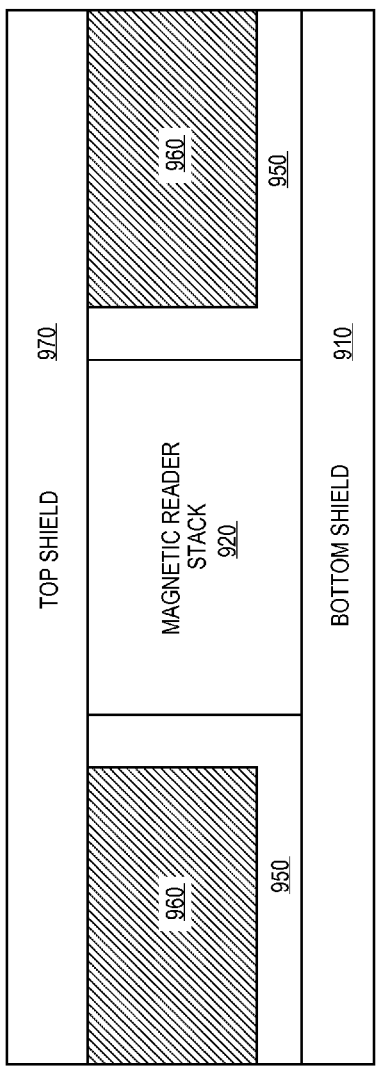
Figure 9K:
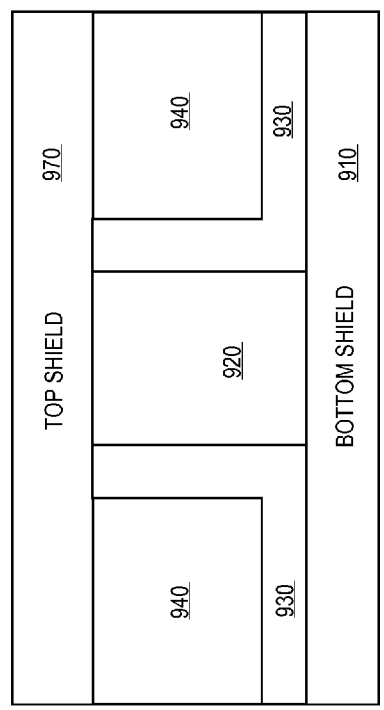

At block 824, the process 800 deposits a top magnetic shield layer 970 (e.g., NiFe) over the back magnetic shield layer 960, insulating layer 950, and reader stack 920 as illustrated in FIG. 9J from the cross-sectional view. The top magnetic shield layer 970 is also disposed above the hard bias materials 940 and insulating layer 930 as illustrated in FIG. 9K from the ABS view. In one embodiment, a ratio of a thickness of the back magnetic shield layer 960 to a spacing 980 between the bottom and top magnetic shield layers is greater than 0.25 with the spacing being based on a height of the reader stack. The top, back, and bottom magnetic shield layers may be soft magnetic alloys. In one embodiment, the insulating layer has a thickness of less than approximately 50 nanometers with a thinner insulating layer increasing a magnetic field being sensed by the reader stack 920. In another embodiment, the insulating layer has a thickness between 30 and 40 nanometers. The insulating layer is typically greater than 20 nanometers in order to effectively provide insulation and prevent noise coupling between the read sensor and the back shield layer.

Figure 10:
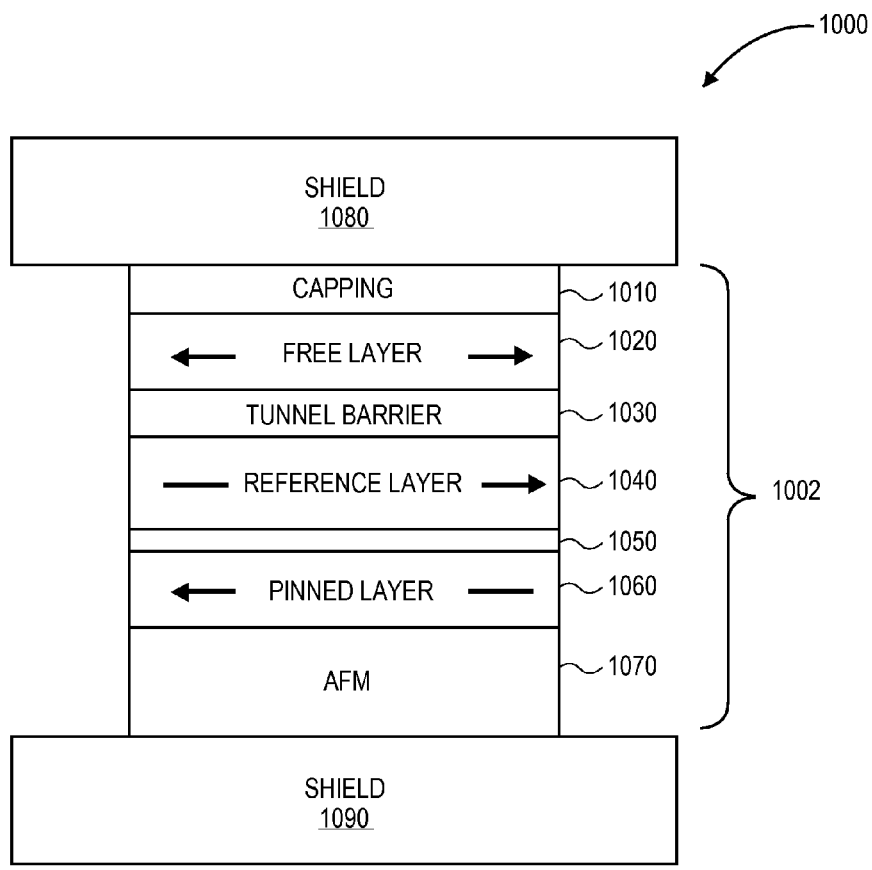
FIG. 10 is an ABS view of a CPP read head with back shielding for a TMR implementation, according to one embodiment of the invention.

FIG. 10 is an ABS view of a CPP read head with back shielding for a TMR implementation, according to one embodiment of the invention. The read head 1000 includes shield layers 1080 and 1090 as well as a read sensor 1002. The read sensor 1002 includes a capping layer 1010, a magnetically free layer 1020, a tunnel barrier 1030, a reference layer 1040, a spacer layer 1050, a magnetically pinned layer 1060, and an antiferromagnetic (AFM) layer 1070.

A TMR read sensor utilizes a magnetic tunnel junction (MTJ) composed of a tunnel barrier layer (e.g., tunnel barrier 1030) made from a non-magnetic insulating material sandwiched between two ferromagnetic layers (e.g., free layer 1020 and reference layer 1040). The insulating layer is thin enough to permit quantum-mechanical tunneling of charge carriers between the ferromagnetic layers. The tunneling is electron spin-dependent and, therefore, the tunneling current depends on the spin-dependent electronic properties of the ferromagnetic materials and the relative orientations of the magnetization directions of the ferromagnetic layers.

The two ferromagnetic layers are designed to have different responses to magnetic fields so that the orientation of their magnetic moments may be varied by an external magnetic field. In FIG. 10, one of the ferromagnetic layers in the MTJ, the reference layer 1040, is composed of a material having a magnetic moment that does not rotate in response to an applied magnetic field in the read head's range of interest. The reference layer 1040 and the pinned layer 1060 are antiferromagnetically coupled across spacer layer 1050 (e.g., Ruthenium). The combination of reference layer 1040, spacer layer 1050, and the pinned layer 1060 is also called a synthetic antiferromagnetic (SAF) layer. The SAF layer is pinned by being exchange coupled to an antiferromagnetic (AFM) layer 1070. The other ferromagnetic layer on the other side of the tunnel barrier is a free layer 1020. The magnetic moment of the free layer 1020 is free to respond to an applied magnetic field in the read head's range of interest.

FIG. 11 is an ABS view of a CPP read head with back shielding for a GMR implementation with a metal spacer layer, according to one embodiment of the invention. The read head 1100 includes shield layers 1180 and 1190 as well as a read sensor 1102. The read sensor 1102 includes a capping layer 1110, a magnetically free layer 1120, a metal spacer layer 1130, a reference layer 1140, a spacer layer 1150, a magnetically pinned layer 1160, and an AFM layer 1170. The GMR read head 1100 is similar to the TMR read head 1000. However, the oxide tunnel barrier layer 1030 is replaced with the metal spacer layer 1130 for the GMR read head 1100.

FIG. 12 is an ABS view of a CPP read head with back shielding for a GMR implementation with a current confinement path, according to one embodiment of the invention. The read head 1200 includes shield layers 1280 and 1290 as well as a read sensor 1202. The read sensor 1202 includes a capping layer 1210, a magnetically free layer 1220, a spacer layer 1230, a reference layer 1240, a spacer layer 1250, a magnetically pinned layer 1260, and an AFM layer 1270. The GMR read head 1200 is similar to the GMR read head 1100. However, the metal spacer layer 1130 is replaced with the spacer layer 1230 for the GMR read head 1200. The spacer layer 1230 has a nano-contact area of approximately 10 nanometers in diameter serving as a current flow path 1232. The remainder of the spacer material is an insulating material, such as oxide (e.g., alumina).

FIG. 13 is an ABS view of a CPP read head with back shielding for a GMR implementation with multiple spacer layers, according to one embodiment of the invention. A CPP multilayer GMR head 1300 includes a read sensor 1302 or reader stack having a series of magnetic layers 1320, 1340, 1360 (e.g., Fe, Co, Ni, or alloys) and spacer layers 1330 and 1350 (e.g., Ru, Cu, Cr) stacked in between a bottom shield 1390 and a top shield 1380. The read sensor 1302 also includes a capping layer 1310 and a seed layer 1370. The remainder of the reader design is similar to the CPP TMR design, such as permanent magnet (PM) biasing, atomic layer deposition separation of the stack and the PM biasing, etc.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the specific materials and thicknesses of the layers described above can be varied significantly to practice the invention as will be readily appreciated by those skilled in the art. The methods and processes previously described can be employed for disk drives that utilize CPP read heads. However, numerous alternatives for other types of disk drives with similar or other characteristics can be employed by those skilled in the art to use the invention with equal advantage to implement these techniques. Further, although embodiments have been described in the context of a disk drive with CPP read heads, the invention can be employed in many different types of disk drives having a head that scans the media.

What is claimed is:

1. A read head for reading data from a magnetic media, comprising:
    a bottom magnetic shield layer;
    a top magnetic shield layer;
    a read sensor disposed between the bottom and top magnetic shield layers configured for sensing changes in a magnetic field of the magnetic media positioned under the read sensor, the read sensor having a front end adjacent to an air bearing surface (ABS) and a back end opposite the front end; and
    a back magnetic shield layer positioned between the bottom and top magnetic shield layers and behind the back end of the read sensor distal to the ABS,
    wherein a ratio of a thickness of the back magnetic shield layer to a spacing between the bottom and top magnetic shield layers is greater than 0.25 with the spacing being based on a height of the read sensor.

2. The read head of claim 1, wherein the back magnetic shield layer is coupled to the top magnetic shield layer.

3. The read head of claim 2, further comprising an insulating layer that separates the back end of the read sensor and the bottom shield from the back shield.

4. The read head of claim 1, wherein the back magnetic shield layer is positioned behind the back end of the read sensor to increase a magnitude of the magnetic field sensed from the magnetic media.

5. The read head of claim 1, wherein the back magnetic shield layer is positioned behind the back end of the read sensor to improve uniformity of a magnetic field sensed from the magnetic media.

6. The read head of claim 1, wherein the read head is a current perpendicular-to-plane read head.

7. The read head of claim 1, wherein the back magnetic shield layer is a soft magnetic alloy.

8. A method of fabricating a thin film read head, comprising:
    providing a substrate;
    depositing a bottom magnetic shield layer over the substrate;
    forming a reader stack on the bottom magnetic shield layer;
    depositing an insulating layer over the bottom magnetic shield layer and the reader stack;
    depositing a back magnetic shield layer over the insulating layer; and
    removing a portion of the back magnetic shield layer and a portion of the insulating layer until reaching the reader stack.

9. The method of claim 8, further comprises depositing a top magnetic shield layer over the back magnetic shield layer, insulating layer, and reader stack.

10. The method of claim 8, wherein a ratio of a thickness of the back magnetic shield layer to a spacing between the bottom and top magnetic shield layers is greater than 0.25 with the spacing being based on a height of the reader stack.

11. The method of claim 8, wherein forming the reader stack further comprises:
    forming a photoresist patterned layer on top of the reader stack;
    removing a first side portion and a second side portion of the reader stack;
    depositing another insulating layer and hard bias materials over the bottom shield, reader stack, and photoresist patterned layer;
    forming another photoresist patterned layer on top of the hard bias materials; and
    removing third and fourth side portions of the reader stack.

12. The method of claim 8, wherein removing the portion of the back magnetic shield layer and the portion of the insulating layer until reaching the reader stack comprises a chemical mechanical polishing operation that planarizes the layers above the reader stack prior to the deposition of the top magnetic shield layer.

13. The method of claim 8, wherein removing the portion of the back magnetic shield layer and the portion of the insulating layer until reaching the reader stack comprises an etching operation that planarizes the back magnetic shield layer with respect to the reader stack while the insulating layer is non-planar with respect to the reader stack prior to the deposition of the top magnetic shield layer.

14. The method of claim 8, wherein the reader stack comprises a front end adjacent to an air bearing surface (ABS) and a back end opposite the front end with the insulating layer being conformally deposited on the back end and forming an angle between 45 degrees and substantially 90 degrees with respect to the substrate.

15. The method of claim 8, wherein the insulating layer has a thickness of less than approximately 50 nanometers with a thinner insulating layer increasing a magnetic field being sensed by the reader stack.

16. A system for storing and retrieving data to and from a magnetic recording media, comprising:
   a head assembly, positionable adjacent the magnetic recording media, the head assembly having a write head and a read head, the read head comprising:
   a bottom magnetic shield layer;
   a top magnetic shield layer;
   a read sensor disposed between the bottom and top magnetic shield layers configured for sensing changes in magnetic properties of a track on the magnetic media positioned under the read sensor, the read sensor having a front end adjacent to an air bearing surface (ABS) and a back end opposite the front end;
   a back magnetic shield layer positioned between the bottom and top magnetic shield layers and behind the back end of the read sensor; and
   a drive device for coupling to the media so as to move the media with respect to the head assembly,
   wherein a ratio of a thickness of the back magnetic shield layer to a spacing between the bottom and top magnetic shield layers is greater than 0.25 and less than or equal to 2.0 with the spacing being based on a height of the read sensor.

17. The system of claim 16, wherein the back magnetic shield layer is coupled to the top magnetic shield layer.

18. The system of claim 16, further comprising an insulating layer that separates the back end of the read sensor and the bottom shield from the back shield.

* * * * *